US012782193B2

(12) United States Patent
Chang et al.

(10) Patent No.: US 12,782,193 B2
(45) Date of Patent: Nov. 3, 2026

(54) AMBIENT LIGHT SENSOR WITH ULTRAVIOLET LIGHT DETECTION FUNCTION

(71) Applicant: Taiwan-Asia Semiconductor Corporation, Hsinchu City (TW)

(72) Inventors: You-Hsien Chang, Hsinchu City (TW); Yan-Ting Liu, Hsinchu City (TW)

(73) Assignee: TAIWAN-ASIA SEMICONDUCTOR CORPORATION, Hsinchu City (TW)

( * ) Notice: Subject to any disclaimer, the term of this patent is extended or adjusted under 35 U.S.C. 154(b) by 428 days.

(21) Appl. No.: 18/449,455

(22) Filed: Aug. 14, 2023

(65) Prior Publication Data

US 2024/0418566 A1 Dec. 19, 2024

(30) Foreign Application Priority Data

Jun. 15, 2023 (TW) ................................ 112122494

(51) Int. Cl.
*G01J 1/02* (2006.01)
*G01J 1/04* (2006.01)
*G01J 1/42* (2006.01)

(52) U.S. Cl.
CPC ............ *G01J 1/029* (2013.01); *G01J 1/0433* (2013.01); *G01J 1/0437* (2013.01); *G01J 1/4204* (2013.01); *G01J 1/429* (2013.01)

(58) Field of Classification Search
CPC ........ G01J 1/029; G01J 1/0433; G01J 1/0437; G01J 1/4204; G01J 1/429; G01J 1/44
See application file for complete search history.

(56) References Cited

U.S. PATENT DOCUMENTS

| | | | | |
|---|---|---|---|---|
| 2010/0187426 | A1* | 7/2010 | Young | G01J 1/0209 250/370.07 |
| 2013/0082241 | A1 | 4/2013 | Kub et al. | |
| 2019/0305157 | A1* | 10/2019 | Kub | H10F 30/21 |
| 2021/0193719 | A1* | 6/2021 | Del Monte | C09K 11/02 |
| 2025/0035965 | A1* | 1/2025 | Steinberg | G02F 1/0157 |

FOREIGN PATENT DOCUMENTS

| | | |
|---|---|---|
| TW | 201143162 A | 12/2011 |
| TW | 201530101 A | 8/2015 |
| TW | 201937208 A | 9/2019 |

* cited by examiner

*Primary Examiner* — Moazzam Hossain
(74) *Attorney, Agent, or Firm* — MUNCY, GEISSLER, OLDS & LOWE, P.C.

(57) ABSTRACT

The present invention provides an ambient light sensor with ultraviolet light detection function, which is adopted to receive external light for sensing. The ambient light sensor comprises a visible light sensing chip and a wavelength conversion layer. The visible light sensing chip is used for sensing light corresponding to the response band of visible light, and the visible light sensing chip includes a light receiving surface. The wavelength conversion layer is used to convert light corresponding to a specific ultraviolet light band of the external light into light corresponding to a response band of visible light, and the wavelength conversion layer covers at least a part of the light receiving surface.

8 Claims, 5 Drawing Sheets

AMBIENT LIGHT SENSOR WITH ULTRAVIOLET LIGHT DETECTION FUNCTION

This application claims priority to Taiwan Patent Application No. 112122494 filed on Jun. 15, 2023, which is hereby incorporated by reference in its entirety.

CROSS-REFERENCES TO RELATED APPLICATIONS

Not applicable.

BACKGROUND OF THE INVENTION

1. Field of the Invention

The present invention relates to an ambient light sensor, especially an ambient light sensor with ultraviolet light detection function.

2. Description of Related Art

Ambient light sensors (ALS) can be applied to electronic devices, and through detecting variations of light in surrounding environments by ambient light sensors, execution functions of electronic devices adjust or switch accordingly. For example, when an ambient light sensor is configured to a smartphone or a device with a similar display screen, functions such as brightness of the display screen can be automatically adjusted according to detection results of the ambient light sensor.

Ambient light sensors are roughly divided into visible light sensors, infrared light sensors and ultraviolet light sensors, based on different materials used for absorbing layers. When there are different light sensing requirements and at least two kinds of light sensors mentioned above are necessarily applied at the same time, it causes inconvenience. Furthermore, the conventional ambient light sensor adopting silicon as the absorbing layer material is able to support for UV-A ultraviolet light band sensing, but the sensing response of the ambient light sensor for the ultraviolet band is lower, and the light with wavelength from 400 nm to 1000 nm also becomes noise, thus limiting the ability of the conventional ultraviolet light sensor for sensing ultraviolet light. In addition, the application of this ambient light sensor is only for UV-A ultraviolet light sensing. On the other hand, although the conventional ambient light sensor adopting silicon carbide as the absorbing layer material is able to support for a wider range of ultraviolet light band sensing, this ambient light sensor is unable to sense light corresponding to visible light band.

In light of this, it is really worthy of research and development to design an ambient light sensor that solves those above-mentioned problems.

SUMMARY OF THE INVENTION

An objective of the present invention is to provide an ambient light sensor utilizing visible light sensing chips and offering ultraviolet light detection function.

Another objective of the present invention is to provide an ambient light sensor being able to filter specific ultraviolet light bands and to process detection.

Yet another objective of the present invention is to provide an ambient light sensor combining functions of visible light detection and ultraviolet light detection.

To achieve the above mentioned objectives, the ambient light sensor with ultraviolet light detection function of the present invention comprises a visible light sensing chip and a wavelength conversion layer. The visible light sensing chip is used for sensing light corresponding to a response band of visible light and includes a light receiving surface. The wavelength conversion layer is used to convert light corresponding to a specific ultraviolet light band of the external light into light corresponding to the response band of visible light and covers at least a part of the light receiving surface In one embodiment of the present invention, the wavelength conversion layer covers the whole of the light receiving surface.

In one embodiment of the present invention, the ambient light sensor with ultraviolet light detection function further comprises a band-pass filter formed on the wavelength conversion layer for filtering the light corresponding to the specific ultraviolet light band of the external light.

In one embodiment of the present invention, the specific ultraviolet light band is at least one of wavelength band selected from the following group: 315 nm to 400 nm, 280 nm to 315 nm, and 100 nm to 280 nm.

In one embodiment of the present invention, the wavelength conversion layer is made of phosphor powder.

In one embodiment of the present invention, a plurality of channel zones are formed in the visible light sensing chip and the wavelength conversion layer at least partially covers the light receiving surface corresponding to at least one of the channel zones.

In one embodiment of the present invention, a recessed structure is formed between two adjacent channel zones.

In one embodiment of the present invention, the response band of visible light ranges from about 460 nm to 660 nm.

In one embodiment of the present invention, the visible light sensing chip includes a semiconductor stack structure which has an aluminum gallium indium phosphide material layer.

In one embodiment of the present invention, the visible light sensing chip further includes a substrate, a first electrode layer and a second electrode layer. The semiconductor stack structure and the first electrode layer are disposed on two opposite sides of the substrate respectively. The semiconductor stack structure forms the light receiving surface on a side away from the substrate. The second electrode layer is disposed on the light receiving surface and exposing out of the wavelength conversion layer.

Hereby, the ambient light sensor with ultraviolet light detection function of the present invention, by disposing of the wavelength conversion layer, enables the visible light sensing chip to offer sensing function of ultraviolet light band, and enhances the response intensity to ultraviolet light band. Moreover, the ambient light sensor with ultraviolet light detection function of the present invention provides detection functions of ultraviolet light band and visible light band at the same time, not only reducing the volume of ambient light sensor, but also lowering manufacturing cost, compared with conventional technology.

DETAILED DESCRIPTION OF THE PREFERRED EMBODIMENT

Since various examples and embodiments in the present invention are only illustrative and non-restrictive, a person skilled in the art can easily conceive other examples and embodiments without contravening the scope of the present invention, after reading this specification, and can make the features and advantages of these embodiments more evident based on the following detailed description and claims.

Herein, the description of unit, element and component in the present invention uses "one", "a", or "an". This is for convenience and for offering general meaning of the category of the present invention. Therefore, the description should be understood as including "one", "at least one", and singular and plural forms at the same time unless the context clearly indicates otherwise.

Herein, the description of the terms "first" or "second" and similar ordinal numbers are mainly used to distinguish or refer to the same or similar elements or structures and do not necessarily imply that such components or structures are spatially or temporally distinct order. It should be understood that ordinal numbers, in certain situations or configurations, may be used interchangeably without affecting the implementation of the present invention.

Herein, the description of "comprise", "have" or other similar semantics have the non-exclusive meaning. For example, components or structures with a plurality of elements are not only limited to those disclosed in this specification, but also include generally inherent elements, which are not explicitly listed here for the components or the structures.

Figure 1:
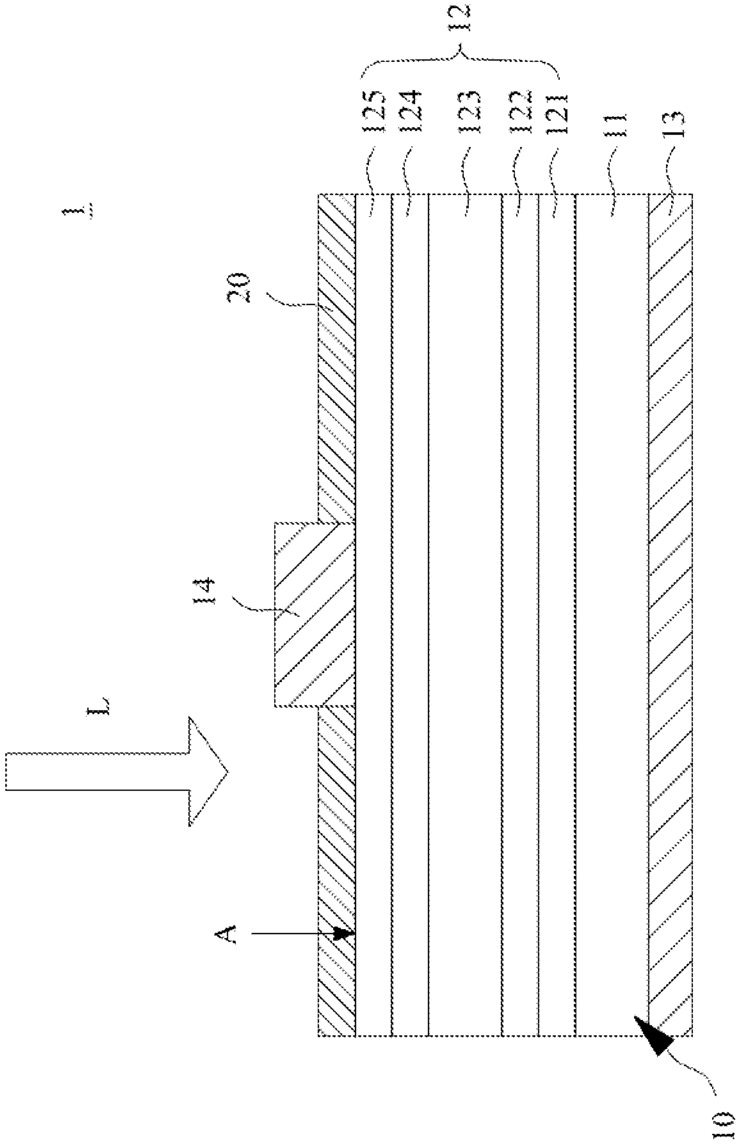
FIG. 1 is a schematic view of the first embodiment of an ambient light sensor with ultraviolet light detection function according to the present invention.

The ambient light sensor with ultraviolet light detection function of the present invention is adopted to receive external light for processing detection, and the external light may at least include visible light, ultraviolet light, or even infrared light. Please refer to FIG. 1, which is a schematic view of the first embodiment of an ambient light sensor with ultraviolet light detection function according to the present invention. As shown in FIG. 1, in this embodiment, the ambient light sensor 1 with ultraviolet light detection function of the present invention comprises a visible light sensing chip 10 and a wavelength conversion layer 20. The wavelength conversion layer 20 is formed on the visible light sensing chip 10.

The visible light sensing chip 10 is used to sense light corresponding to a response band of visible light. For example, in the present invention, the visible light sensing chip 10 is capable of sensing the response band of visible light from about 460 nm to 660 nm, with the response peak wavelength of about 560 nm to 570 nm, but not limited thereto. The visible light sensing chip 10 includes a light receiving surface A. The external light enters the visible light sensing chip 10 from the light receiving surface A for being sensed.

The visible light sensing chip 10 further includes a substrate 11, a semiconductor stack structure 12, a first electrode layer 13 and a second electrode layer 14. The substrate 11 is mainly used as a basic structural member for carrying or/and for disposing the aforementioned related structural members of the visible light sensing chip 10. In the present invention, the substrate 11 is a gallium arsenide (GaAs) substrate, but the material of the substrate 11 may be changed according to different design requirements. The first electrode layer 13 is mainly adopted as one of conduction paths of electric current, and the first electrode layer 13 is disposed on one side of the substrate 11. In the present invention, the first electrode layer 13 is made of gold-containing alloy (Au-alloy) material, but not limited thereto.

The semiconductor stack structure 12 is mainly adopted to absorb the light corresponding to the response band of visible light and convert it into a current signal, and the semiconductor stack structure 12 is disposed on the other side of the substrate 11. That is, the semiconductor stack structure 12 and the first electrode layer 13 are disposed on two opposite sides of the substrate 11 respectively. The semiconductor stack structure 12 can use III-V compound semiconductor materials. For example, in the present invention, the semiconductor stack structure 12, from its one side adjacent to the substrate 11, sequentially has an aluminum gallium arsenide (AlGaAs) material layer 121, an aluminum indium phosphide (AlInP) material layer 122, an aluminum gallium indium phosphide (AlGaInP) material layer 123, an aluminum indium phosphide material layer 124 and a gallium phosphide (GaP) material layer 125. The aluminum gallium indium phosphide (AlGaInP) material layer 123 is used as the main light absorbing layer. While the other side of the semiconductor stack structure 12, away from the substrate 11 (ie, a side of the gallium phosphide material layer 125 facing away from the aluminum indium phosphide material layer 124) forms the light receiving surface A of the visible light sensing chip 10.

The second electrode layer 14 is mainly used as one of the current conduction paths, and is disposed on the light receiving surface A. In the present invention, the second electrode layer 14 is also made of gold-containing alloy material, but not limited thereto. The second electrode layer 14 is at least one bump structure protrusively disposed on the light receiving surface A. That is to say, the second electrode layer 14 only covers a partial area of the light receiving surface A, so that the remaining area of the light receiving surface A are available for the external light to pass through.

In addition, in the present invention, the first electrode layer 13 is an N-type electrode, and structural layers of the semiconductor stack structure 12 adjacent to the first electrode layer 13 are made of N-type semiconductor materials. Whereas the electrode layer 14 is a P-type electrode, and structural layers of the semiconductor stack structure 12 adjacent to the second electrode layer 14 are made of P-type semiconductor materials, but not limited thereto. For example, the aforementioned N-type and P-type electrodes or semiconductor materials can also be interchanged according to requirements.

The wavelength conversion layer 20 is provided for converting light corresponding to the specific ultraviolet light band of the external light into light corresponding to the response band of visible light, so as to facilitate detecting by the visible light sensing chip 10. The wavelength conversion layer 20 is disposed on the light receiving surface A of the visible light sensing chip 10, and covers at least a part of the light receiving surface A. In this embodiment, the wavelength conversion layer 20 partially covers the whole light receiving surface A, and only the second electrode layer 14 protrusively disposed on the light receiving surface A is exposing out of the wavelength conversion layer 20, but not limited thereto. The specific ultraviolet light band that can be converted by the aforementioned wavelength conversion layer 20 is at least one of the wavelength band selected from the following group: 315 nm to 400 nm, 280 nm to 315 nm, and 100 nm to 280 nm. Wherein the band from 315 nm to 400 nm corresponds to the UV-A ultraviolet light band, the band from 280 nm to 315 nm corresponds to the UV-B ultraviolet light band, and the band from 100 nm to 280 nm corresponds to the UV-C ultraviolet light band. In other words, the ultraviolet light band convertible by the wavelength conversion layer 20 may be any single band or a combination of multiple bands as listed above. In the present invention, the wavelength conversion layer 20 is made of materials (such as phosphor powder) with the function of converting the ultraviolet light band. And based on different phosphor powder materials, the specific ultraviolet light band, which the wavelength conversion layer 20 is able to convert, changes accordingly.

Consequently, when the external light enters the ambient light sensor 1 with ultraviolet light detection function of the present invention, it reaches the wavelength conversion layer 20 first. At this time, the light corresponding to the specific ultraviolet light band of the external light (for example, corresponding to UV-A ultraviolet light band) is converted into the light corresponding to the response band of visible light (for example, corresponding to WD 550 nm) through the wavelength conversion layer 20. Then, the converted light corresponding to the response band of visible light passes through the light receiving surface A of the visible light sensing chip 10, and enters the semiconductor stack structure 12 of the visible light sensing chip 10, so that the light is absorbed by the light absorbing layer and correspondingly detected. Thus, detecting operation for ultraviolet light completes by the ambient light sensor 1 with ultraviolet light detection function.

Figure 2:
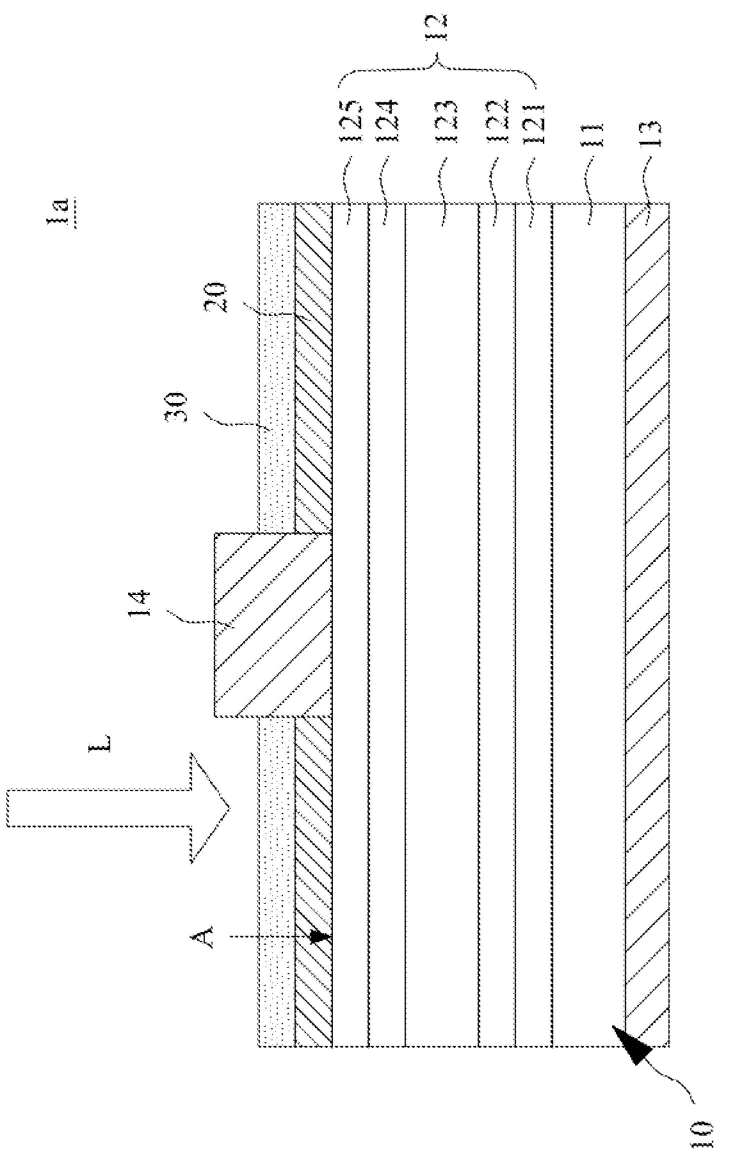
FIG. 2 is a schematic view of the second embodiment of the ambient light sensor with ultraviolet light detection function according to the present invention.

Please refer to FIG. 2 which is a schematic view of the second embodiment of the ambient light sensor with ultraviolet light detection function according to the present invention. This embodiment is a modification of the aforementioned first embodiment, with a difference of disposing of a band-pass filter. As shown in FIG. 2, in this embodiment, the ambient light sensor 1*a* with ultraviolet light detection function of the present invention further includes a band-pass filter 30. The band-pass filter 30 is provided for accordingly filtering the light corresponding to at least one specific ultraviolet wavelength band of the external light, so as to exclude the light corresponding to other unnecessary wavelength bands. The band-pass filter 30 is formed on the wavelength conversion layer 20. In this embodiment, the band-pass filter 30 covers the whole of the wavelength conversion layer 20, while the second electrode layer 14 protrusively disposed on the light receiving surface A is exposing out of the wavelength conversion layer 20 and is also exposing out of the band-pass filter 30, but not limited thereto. The above-mentioned specific ultraviolet light band that can be filtered by the band-pass filter 30 is at least one wavelength band selected from the following group: 315 nm to 400 nm (corresponding to UV-A ultraviolet light band), 280 nm to 315 nm (corresponding to UV-B ultraviolet light band) and 100 nm to 280 nm (corresponding to UV-C ultraviolet light band). That is to say, the specific wavelength band of ultraviolet light filtered by the band-pass filter 30 may be any single band or a combination of multiple bands as listed above. Based on different materials and structural designs for the band-pass filter 30, the specific ultraviolet light band can be filtered is correspondingly changed.

The band-pass filter 30 is usually a multi-membrane structure formed through layer-by-layer stacking of two kinds of membranes with different materials, and each membrane is different in the material from its adjacent membrane. For example, in a configuration, the band-pass filter 30 can use a combination of two dielectric materials with different n values, such as a silicon nitride ($Si_3N_4$) membrane matching with a silicon dioxide ($SiO_2$) membrane, to form overlap stacked layers. Alternatively, the band-pass filter membrane 30 can also use a combination of a metal and a dielectric material, such as an aluminum (Al) or silver (Ag) membrane matching with an aluminum oxide ($Al_2O_3$) or silicon dioxide membrane, to form alternate stacked layers, but not limited thereto.

Accordingly, when the external light enters the ambient light sensor 1*a* with ultraviolet light detection function of the present invention, it reaches the band-pass filter 30 first. At this time, a portion of the external light which excepts the portion corresponding to the specific ultraviolet light band of the external light (for example, corresponding to UV-A ultraviolet light band) continues passing through the band-pass filter 30 and reaches the wavelength conversion layer 20, whereas the portion of the external light corresponding to other bands is filter off by the band-pass filter 30. That is, the external light passes through the band-pass filter 30 to retain the light corresponding to the specific ultraviolet light band, thereby enhancing the detecting effect of ultraviolet light. Then, the light corresponding to the specific ultraviolet light band passes through the band-pass filter 30, and enters the wavelength conversion layer 20 and the visible light sensing chip 10 sequentially. The functional description of the wavelength conversion layer 20 and the visible light sensing chip 10 are the same as the first embodiments, and will not be repeated here.

Figure 3:
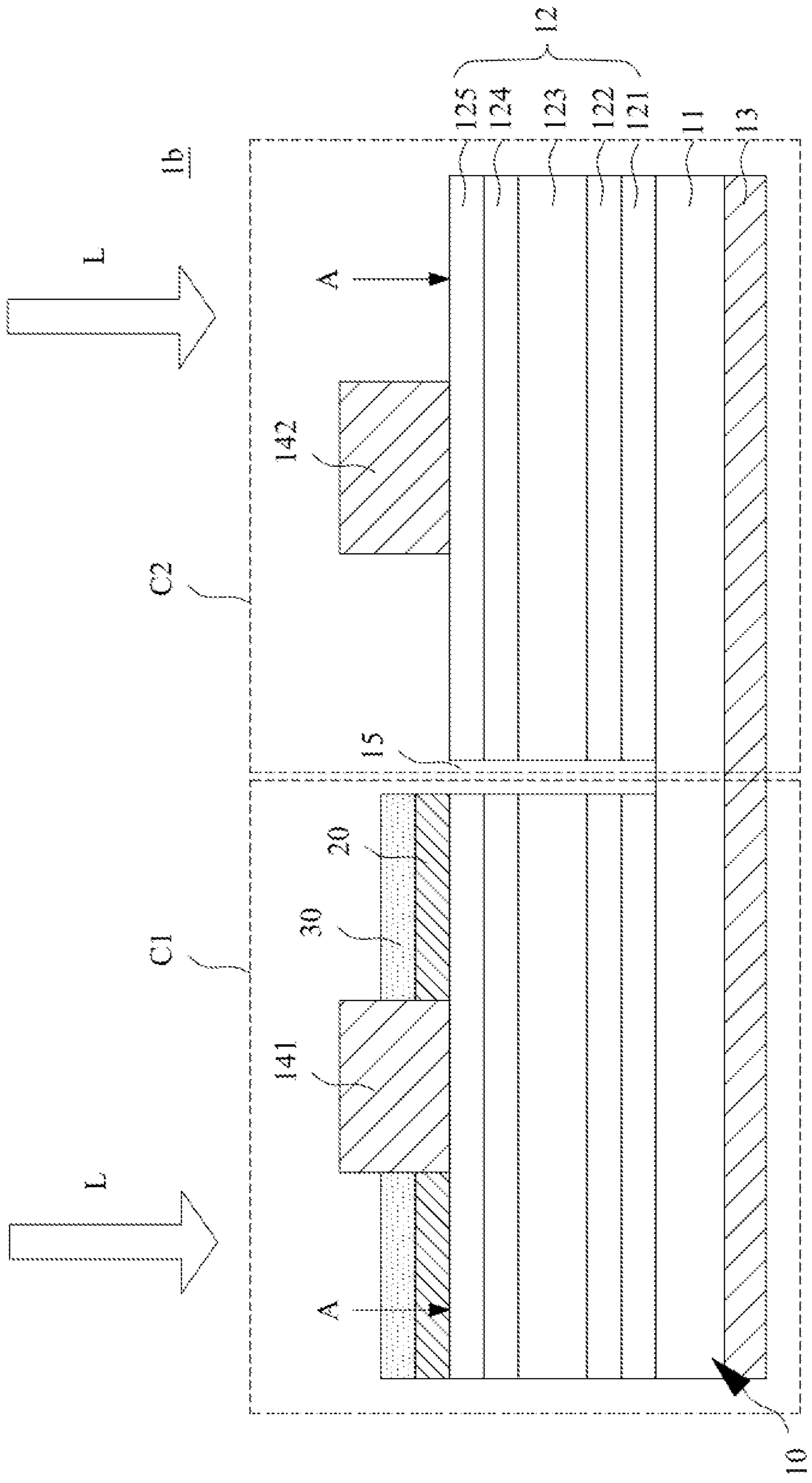
FIG. 3 is a schematic view of the third embodiment of the ambient light sensor with ultraviolet light detection function according to the present invention.

Please refer to FIG. 3 which is a schematic view of the third embodiment of the ambient light sensor with ultraviolet light detection function according to the present invention. This embodiment is a modification of the aforementioned second embodiment, with a difference of a combination of ultraviolet light and visible light detecting functions through a structural configuration. As shown in FIG. 3, in this embodiment, a plurality of channel zones are formed in the visible light sensing chip 10 of the ambient light sensor 1*b* with ultraviolet light detection function of the present invention, and a recessed structure is formed between two adjacent channel zones. The wavelength conversion layer 20 covers the light receiving surface A corresponding to at least one of the channel zones. In addition, the second electrode layer forms independent electrode parts corresponding to the channel zones respectively.

For example, a first channel zone C1 and a second channel zone C2 adjacently form in the aforementioned visible light sensing chip 10, and the visible light sensing chip 10 further includes a recessed structure 15. The recessed structure 15 is located between the first channel zone C1 and the second channel zone C2, and runs through the semiconductor stack structure 12 from the light receiving surface A of the visible light sensing chip 10 and to the substrate 11. In this embodiment, the wavelength conversion layer 20 partially covers the light receiving surface A corresponding to the first channel zone C1, and a band-pass filter 30 forms on the wavelength conversion layer 20, so that the first channel zone C1 is able to provide the ultraviolet light detection function for the external light. Furthermore, the light receiving surface A corresponding to the second channel zone C2 is a bare surface, so that the corresponding second channel zone C2 is able to provide the visible light detection function for the external light. The second electrode layer 14 includes a first sub-electrode part 141 corresponding to the first channel zone C1 and protruding from the light receiving surface A, and the first sub-electrode part 141 is exposing out of the wavelength conversion layer 20 and the band-pass filter film 30. Moreover, the second electrode layer 14 further includes a second sub-electrode part 142 corresponding to the second channel zone C2 and protruding from the light-receiving surface A. The first channel zone C1 and the second channel zone C2 are separated by the recessed structure 15 to avoid mutual interference of the detection functions for ultraviolet light and visible light.

Figure 4:
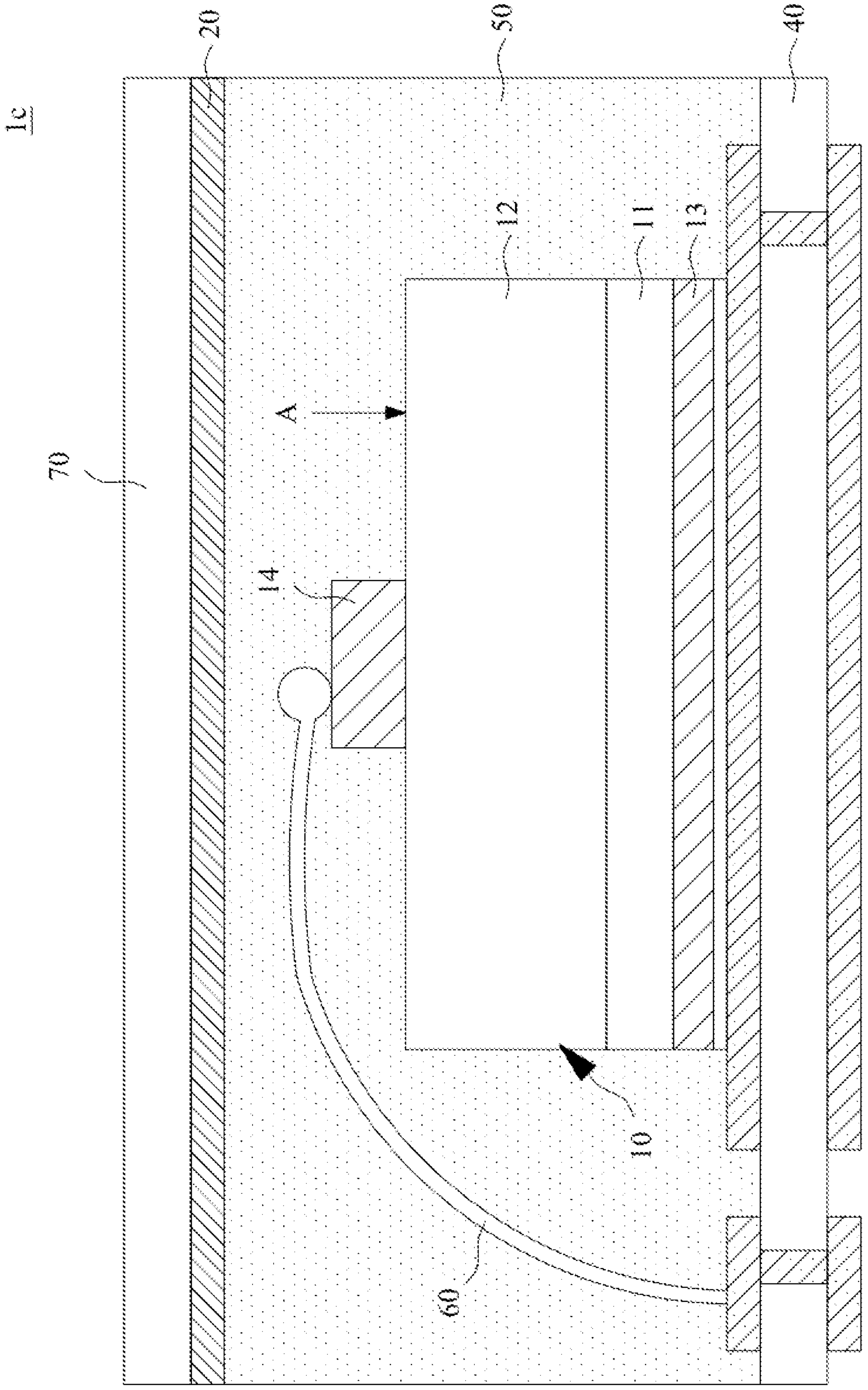
FIG. 4 is a schematic view of the fourth embodiment of the ambient light sensor with ultraviolet light detection function according to the present invention.

Please refer to FIG. 4 which is a schematic view of the fourth embodiment of the ambient light sensor with ultraviolet light detection function according to the present invention. This embodiment is a modification of the first embodiment, with differences of the arrangement of the wavelength conversion layer 20 and of the combination with a package structure of the visible light sensing chip and a circuit board. As shown in FIG. 4, in this embodiment, the visible light sensing chip 10 of the ambient light sensor 1*c* with ultraviolet light detection function of the present invention is disposed on a circuit board 40. The first electrode layer 13 of the visible light sensing chip 10 is connected to a metal conductive layer of the circuit board 40 through silver glue, and the second electrode layer 14 of the visible light sensing chip 10 is connected to another metal conductive layer of the circuit board 40 through wires 60 (such as gold wires). The circuit board 40 mentioned here is a printed circuit board. The package structure 50 is used for completely covering the visible light sensing chip 10 and the wires 60, and for partially covering the circuit board 40, so as to accomplish the packaging of the ambient light sensor 1*c* with ultraviolet light detection function of the present invention. Here, the packaging structure 50 can be transparent silicone or molding plastic material (such as epoxy resin). In this embodiment, the wavelength conversion layer 20 is disposed on the packaging structure 50, and the area of the wavelength conversion layer 20 is larger than that of the light receiving surface A of the visible light sensing chip 10, so that the wavelength conversion layer 20 correspondingly covers the light-receiving surface A entirely. In addition, a cover-plate 70, such as a glass or plastic cover-plate, is optionally disposed on the wavelength conversion layer 20. Hereby, an overall area of the wavelength conversion layer 20 of the ambient light sensor 1*c* with ultraviolet light detection function of the present invention increases, not only to ensure that the external light passes through the wavelength conversion layer 20, but also to improve the applying convenience by combining the visible light sensing chip 10 with the packaging structure and the circuit board 40.

Figure 5:
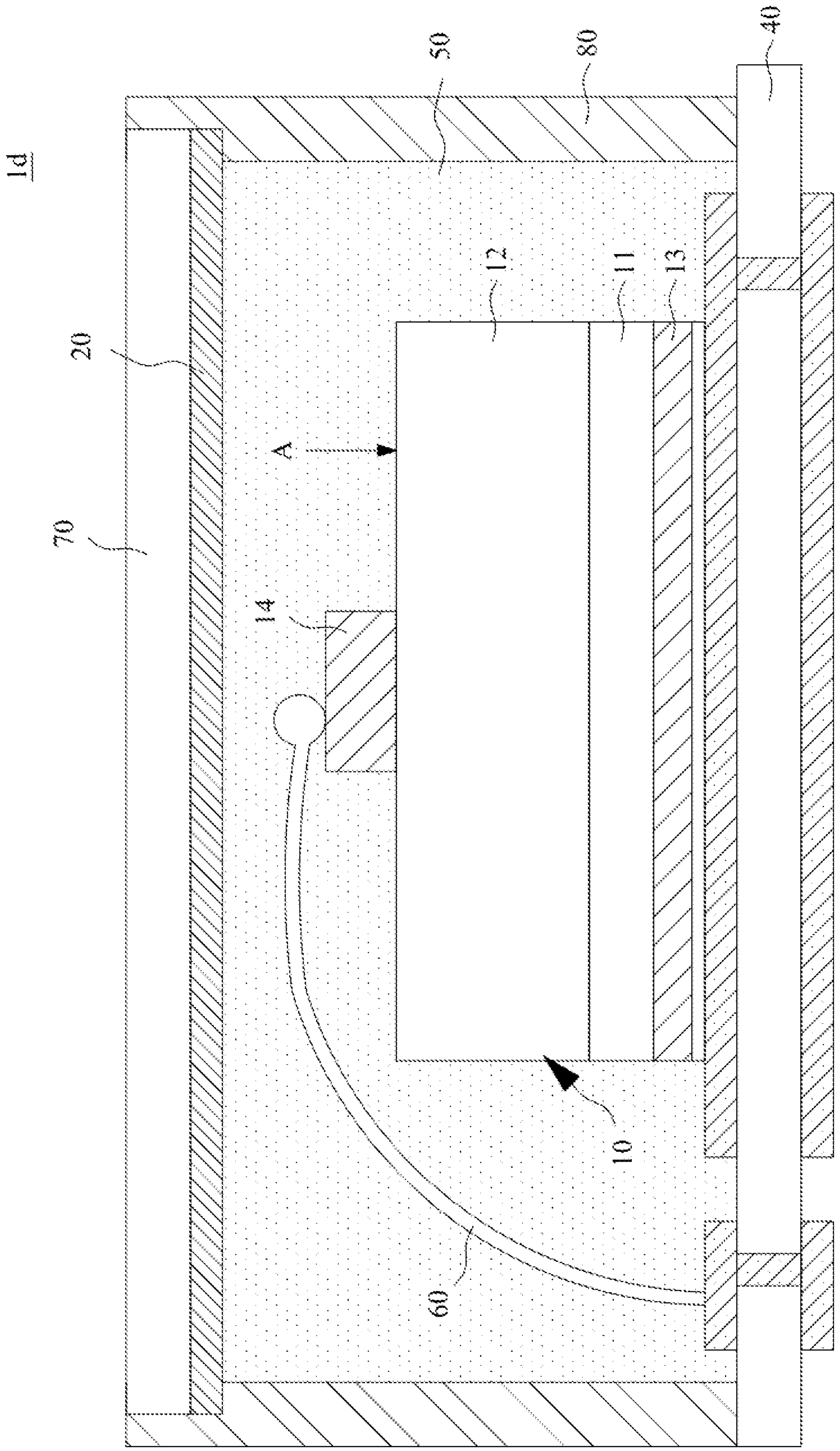
FIG. 5 is a schematic view of the fifth embodiment of the ambient light sensor with ultraviolet light detection function according to the present invention.

Please refer to FIG. 5 which is a schematic view of the fifth embodiment of the ambient light sensor with ultraviolet light detection function according to the present invention. This embodiment is a modification of the aforementioned fourth embodiment, with a difference of adding a barrier wall. As shown in FIG. 5, in this embodiment, the ambient light sensor 1*d* with ultraviolet light detection function of the present invention is further provided with a barrier wall 80 on the circuit board 40. The barrier wall 80 is circumferentially configured around the package structure 50 and provides a supporting effect for the wavelength conversion layer 20 and/or the cover-plate 70. The barrier wall 80 is mainly made of non-transparent epoxy resin, such as packaging black glue, so that the barrier wall 80 is able to keep the light that passes through the wavelength conversion layer 20 from laterally scattering, and to prevent the external light from laterally entering which affects detecting results.

As can be seen from the above-mentioned embodiments, the ambient light sensor with ultraviolet light detection function of the present invention achieves the detection function of ultraviolet light band by applying general visible light sensing chips, and enhances the response intensity to ultraviolet light band. Moreover, the ambient light sensor with ultraviolet light detection function of the present invention provides detection functions of ultraviolet light band and visible light band at the same time by utilizing one visible light sensing chip. Through employing different materials and structures for the wavelength conversion layer or/and band-pass filter, the ambient light sensor with ultraviolet light detection function of the present invention can perform filtering or/and conversion operations for different ultraviolet light bands of light, to meet different using requirements.

The above implementations are only auxiliary descriptions, and are not intended to limit the embodiments of the application subject or the applications or uses of the embodiments. In addition, although at least one illustrative example has been presented above, it should be understood that the present invention can still have a large number of variations. It should also be understood that the embodiments described herein are not intended to limit the scope, use, or configuration of the requested subject matter in any way. On the contrary, the foregoing embodiments will provide a convenient guide for those skilled in the art to implement one or more embodiments. Furthermore, various changes can be made to the function and arrangement of the components without departing from the scope defined by the patent claims, and the scope of the patent claims includes known equivalents and all foreseeable equivalents at the time that the patent application is filed.

What is claimed is:

1. An ambient light sensor with ultraviolet light detection function, being adopted to receive external light for sensing, comprising:

a visible light sensing chip used for sensing light corresponding to a response band of visible light, and including a light receiving surface;

a wavelength conversion layer used to convert light corresponding to a specific ultraviolet light band of the external light into light corresponding to the response band of visible light, and covering at least a part of the light receiving surface; and a band-pass filter formed on the wavelength conversion layer for allowing the light corresponding to the specific ultraviolet light band of the external light to pass through, and filtering the light corresponding to other bands outside of the specific ultraviolet light band of the external light;

wherein the visible light sensing chip includes a semiconductor stack structure which has an aluminum gallium indium phosphide material layer.

2. The ambient light sensor with ultraviolet light detection function as claimed in claim 1, wherein the band-pass filter is a multi-membrane structure formed through layer-by-layer stacking of two kinds of membranes with different materials, and wherein the band-pass filter includes a combination of two dielectric materials with different n values or a combination of a metal and a dielectric material.

3. The ambient light sensor with ultraviolet light detection function as claimed in claim 1, wherein the specific ultraviolet light band is at least one wavelength band selected from the following group: 315 nm to 400 nm, 280 nm to 315 nm, and 100 nm to 280 nm.

4. The ambient light sensor with ultraviolet light detection function as claimed in claim 1, wherein the wavelength conversion layer is made of phosphor powder.

5. The ambient light sensor with ultraviolet light detection function as claimed in claim 1, wherein a plurality of channel zones are formed in the visible light sensing chip and the wavelength conversion layer at least partially covers the light receiving surface corresponding to at least one of the channel zones.

6. The ambient light sensor with ultraviolet light detection function as claimed in claim 5, wherein a recessed structure is formed between two adjacent channel zones.

7. The ambient light sensor with ultraviolet light detection function as claimed in claim 1, wherein the response band of visible light ranges from about 460 nm to 660 nm.

8. The ambient light sensor with ultraviolet light detection function as claimed in claim 1, wherein the visible light sensing chip further includes a substrate, a first electrode layer and a second electrode layer, and the semiconductor stack structure and the first electrode layer are disposed on two opposite sides of the substrate respectively, and wherein the semiconductor stack structure forms the light receiving surface on a side away from the substrate, and the second electrode layer is disposed on the light receiving surface and exposing out of the wavelength conversion layer.

* * * * *